(12) United States Patent
Miyazawa et al.

(10) Patent No.: US 8,616,707 B2
(45) Date of Patent: Dec. 31, 2013

(54) PROJECTOR WITH COOLING MECHANISM

(75) Inventors: Yasunaga Miyazawa, Okaya (JP); Yoshitaka Itoh, Matsumoto (JP); Toshihiko Sakai, Matsumoto (JP); Katsuhiro Matsuyama, Asahi-mura (JP); Yasuteru Miyaoka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 366 days.

(21) Appl. No.: 13/013,582

(22) Filed: Jan. 25, 2011

(65) Prior Publication Data

US 2011/0188005 A1 Aug. 4, 2011

(30) Foreign Application Priority Data

Jan. 29, 2010 (JP) ................. 2010-017916

(51) Int. Cl.
*G03B 21/26* (2006.01)
(52) U.S. Cl.
USPC .......................................................... 353/58
(58) Field of Classification Search
USPC ...................................................... 353/52–61
See application file for complete search history.

(56) References Cited

U.S. PATENT DOCUMENTS 6,007,205 A * 12/1999 Fujimori ..................... 353/57
6,481,854 B1 * 11/2002 Sugawara et al. ............. 353/52
6,513,936 B1   2/2003 Ishiwa et al.
7,896,503 B2 * 3/2011 Woo ............................. 353/61
2009/0190100 A1  7/2009 Tanaka et al.

FOREIGN PATENT DOCUMENTS

| JP | 06-235905 A | 8/1994 |
|---|---|---|
| JP | 07-181421 A | 7/1995 |
| JP | 2001-083637 A | 3/2001 |
| JP | 2001-188305 A | 7/2001 |
| JP | 2006-195368 A | 7/2006 |
| JP | 2009-175404 | 8/2009 |
| JP | 2009-186720 | 8/2009 |

* cited by examiner

*Primary Examiner* — Thanh Luu
(74) *Attorney, Agent, or Firm* — Maschoff Brennan

(57) ABSTRACT

A projector includes: a housing; an optical element accommodated in the housing; and an air supply unit configured to generate a flow of cooling air for cooling a cooling target element including the optical element, a dustproof area into which the cooling air can be introduced from the outside of the housing via a dustproof filter is formed inside the housing, the optical element is accommodated in the dustproof area of the housing, and the air supply unit includes a first air supply unit configured to introduce the cooling air from the outside of the housing to the dustproof area via the dustproof filter, and a second air supply unit accommodated in the dustproof area and configured to supply the cooling air introduced to the dustproof area by the first air supply unit toward the optical element.

6 Claims, 6 Drawing Sheets

PROJECTOR WITH COOLING MECHANISM

The present application claims priority and incorporates by reference in its entirety Japanese Patent Application No. 2010-017916 filed Jan. 29, 2010.

BACKGROUND

1. Technical Field

The present invention relates to a projector, and more particularly to a projector which includes a cooling mechanism.

2. Related Art

A projector includes a spatial light modulation device having a liquid crystal display panel and a polarizer, and a cooling mechanism for cooling a light source and others, for example. As an example of the cooling mechanism for the projector, such a mechanism which cools the respective parts of the projector by using air introduced via a dustproof filter for preventing adhesion of dust or the like to optical elements has been proposed (for example, see JP-A-2009-186720 and JP-A-2009-175404).

In case of the projector, efficient cooling by using cooling air is required so as to reduce fan noise as much as possible. For providing efficient cooling, a cooling duct having the smallest possible flow path for cooling air is employed, for example. When the projector has a simple structure, the cooling duct can be positioned relatively easily. However, when the projector is of a high-accuracy or high-luminance type having a complicated structure, equipment of the cooling duct becomes difficult in some cases. For example, in case of a projector which requires cooling for a plurality of optical elements as a result of luminance increase of a light source, the necessity of providing plural cooling ducts for guiding cooling air to the plural optical elements as the cooling targets, and the necessity of providing a cooling duct having a complicated shape may be produced. In this case, equipment of the cooling duct becomes difficult. When the cooling duct has a complicated shape, the fluid resistance rises and thus introduces problems such as noise increase caused by actuation of the fan and cooling efficiency drop. In case of a structure which can control positions of optical components by using a control mechanism, the positions of blowout holes of cooling ducts equipped for optical elements as cooling target elements are shifted at the time of position control of the optical components. In this case, the cooling efficiency may be lowered.

SUMMARY

An advantage of some aspects of the invention is to provide a projector capable of preventing adhesion of dust or the like to an optical element, reducing limitation to deposition of a cooling mechanism equipped for a cooling target element, and cooling the cooling target with high efficiency.

A projector according to an aspect of the invention includes: a housing; an optical element accommodated in the housing; and an air supply unit configured to generate a flow of cooling air for cooling a cooling target element including the optical element. A dustproof area into which the cooling air can be introduced from the outside of the housing via a dustproof filter is formed inside the housing. The optical element is accommodated in the dustproof area of the housing. The air supply unit includes a first air supply unit configured to introduce the cooling air from the outside of the housing to the dustproof area via the dustproof filter, and a second air supply unit accommodated in the dustproof area and configured to supply the cooling air introduced to the dustproof area by the first air supply unit toward the optical element.

According to this structure, the optical element is stored in the dustproof area. Thus, adhesion of dust or the like to the optical element is prevented. Moreover, since the first air supply unit and the second air supply unit are both provided, the second air supply unit is positioned with a high degree of freedom for each optical element as the cooling target element. Accordingly, prevention of adhesion of dust or the like to the optical element and reduction of limitation to the disposition of the cooling mechanism for the cooling target element can be both achieved, which increases the efficiency of cooling for the cooling target.

It is preferable that a first area as the dustproof area and a second area into which the cooling air from the first area enters are formed inside the housing, and that the second area accommodates the cooling target element other than the optical element. According to this structure, the optical element is cooled in the first area to which clean air is introduced, and the cooling target element other than the optical element is cooled in the second area.

It is preferable that a partitioning wall for separating the first area and the second area is formed inside the housing, and that the partitioning wall has a clearance through which the cooling air flowing from the first area to the second area passes. According to this structure, the cooling air having passed through the first area and then the second area is discharged while maintaining high dustproof capability for the first area.

It is preferable that the projector further includes an open/close unit configured to open and close the clearance. According to this structure, the open/close unit opens during operation of the air supply unit to allow the cooling air to travel from the first area through the clearance to the second area. The open/close unit closes during stop of the air supply unit to close the first area and maintain the clean condition therein.

It is preferable that the first air supply unit generates a flow of the cooling air such that the internal pressure of the first area becomes higher than the internal pressure of the second area. According to this structure, the cooling air moves from the first area to the second area at the clearance. Thus, entrance of dust or the like from the second area to the first area through the clearance can be prevented.

It is preferable that the first air supply unit includes an intake fan configured to introduce the cooling air from the outside of the housing to the dustproof area via the dustproof filter, and an exhaust fan configured to discharge the cooling air from the dustproof area to the outside of the housing. In this case, the operations of the intake fan and the exhaust fan are controlled such that the amount of the cooling air introduced to the dustproof area by the intake fan becomes larger than the amount of the cooling air discharged from the dustproof area by the exhaust fan. According to this structure, the internal pressure of the first area becomes higher than the internal pressure of the second area.

It is preferable that the projector further includes: a first intake fan configured to introduce the cooling air from the outside of the housing to the first area via the dustproof filter; and a second intake fan configured to introduce the cooling air from the outside of the housing to the second area. In this case, the operations of the first intake fan and the second intake fan are controlled such that the amount of the cooling air introduced to the first area by the first intake fan becomes larger than the amount of the cooling air introduced to the second area by the second intake fan. According to this structure, the internal pressure of the first area becomes higher than the internal pressure of the second area.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment according to the invention is hereinafter described in detail with reference to the drawings.

Figure 1:
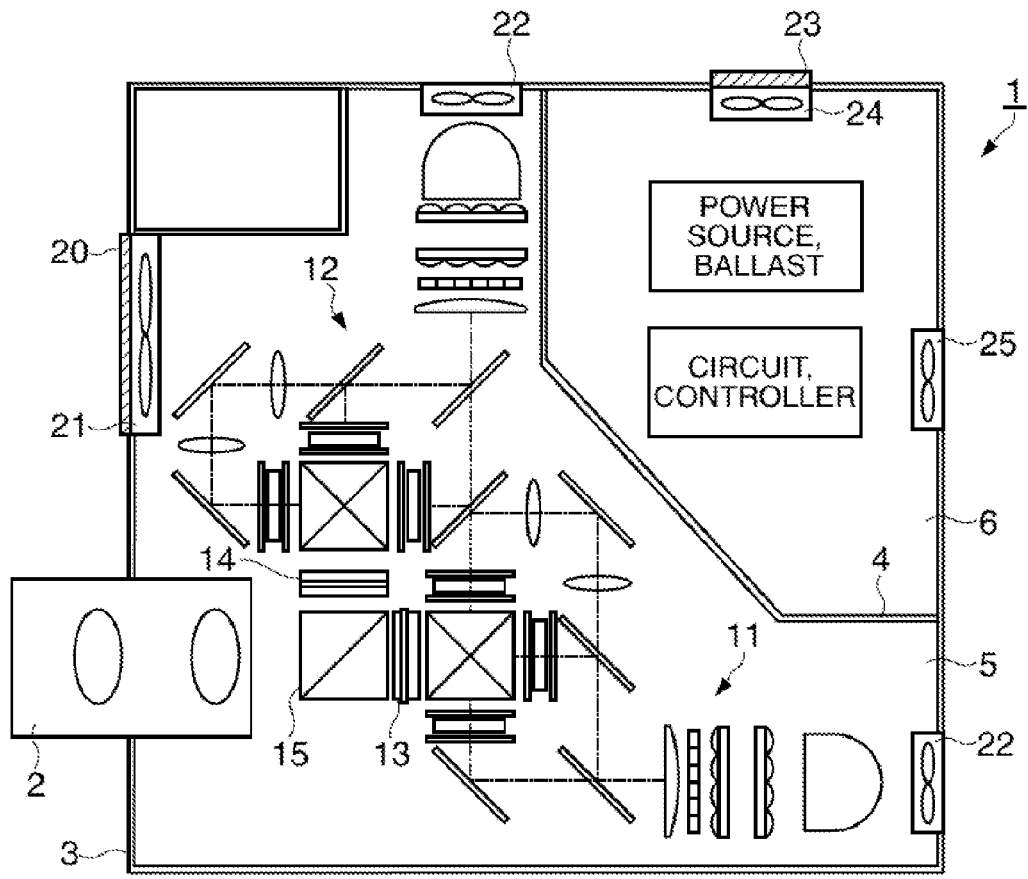
FIG. 1 schematically illustrates the general structure of a projector according to an embodiment of the invention.

FIG. 1 schematically illustrates the general structure of a projector 1 according to an embodiment of the invention. The projector 1 is a front projection type projector which projects light onto a light receiving surface such as a screen for observation of the light reflected by the light receiving surface. A first area 5 and a second area 6 separated from each other by a partitioning wall 4 are formed within a housing 3 of the projector 1. The first area 5 accommodates a first optical system 11, a second optical system 12, a first wavelength selective polarization converting element 13, a second wavelength selective polarization converting element 14, and a polarization prism 15. The first area 5 chiefly contains optical elements for producing an optical image. The second area 6 chiefly contains a power source, a ballast, a circuit, a controller and others.

Figure 2:
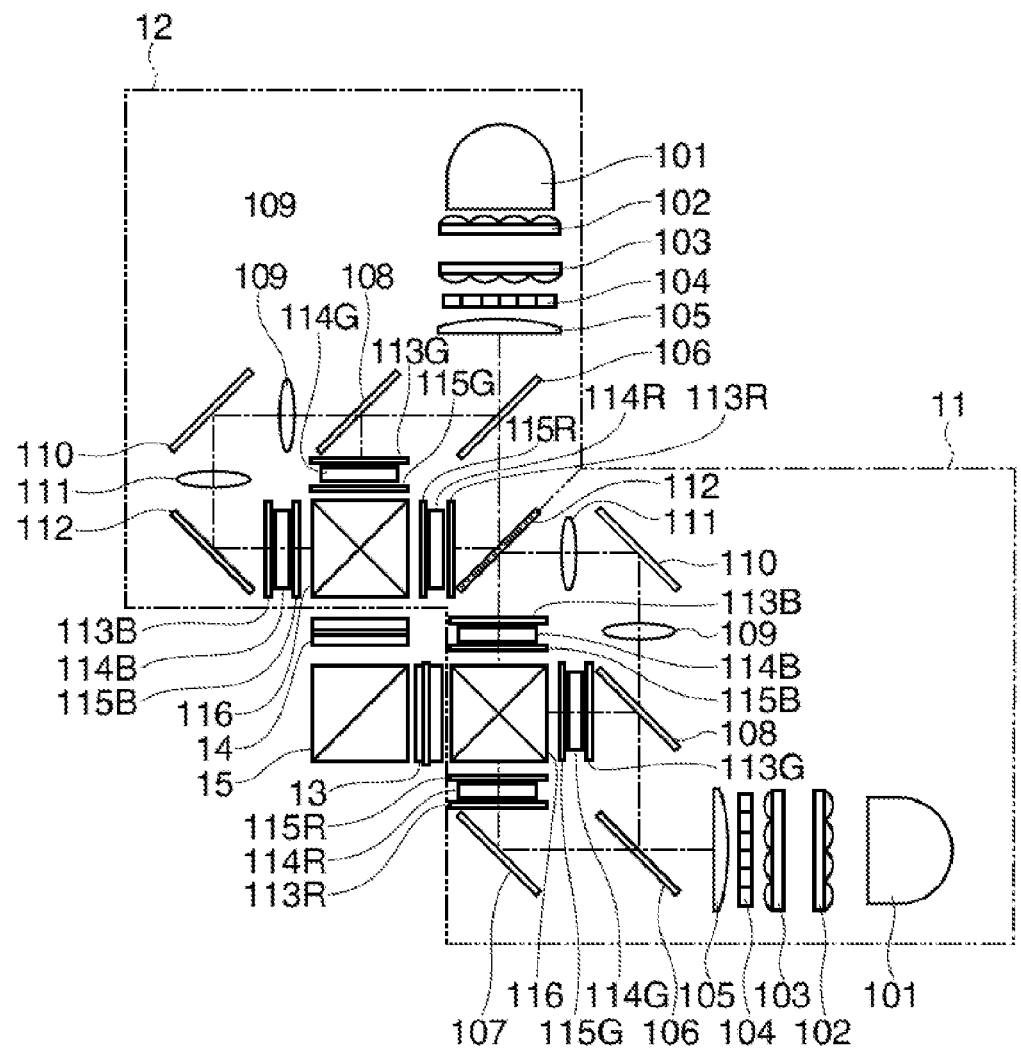
FIG. 2 illustrates a structure accommodated in a first area.

FIG. 2 illustrates a structure stored in the first area 5. The projector 1 forms an optical image using each of the first optical system 11 and the second optical system 12 in accordance with an image signal. The first optical system and the second optical system 12 are positioned approximately symmetric with respect to a polarization film of the polarization prism 15 in directions shifted from each other by approximately 90 degrees.

The structure of the first optical system 11 is now explained. A light source 101 of the first optical system 11 is constituted by an extra-high pressure mercury lamp, for example, and emits light containing red (R) light, green (G) light, and blue (B) light. Each of a first integrator lens 102 and a second integrator lens 103 has a plurality of lens elements arranged in arrays. The first integrator lens 102 divides light received from the light source 101 into plural parts. The respective lens elements of the first integrator lens 102 converge the light received from the light source 101 on an area around the lens elements of the second integrator lens 103. The lens elements of the second integrator lens 103 form images of the lens elements of the first integrator lens 102 on liquid crystal display panels 114R, 114G, and 114B.

A polarization converting element 104 converts the light received from the second integrator lens 103 into predetermined linearly polarized light such as s-polarized light. A stacking lens 105 stacks the images of the respective lens elements of the first integrator lens 102 on light receiving surfaces of the liquid crystal display panels 114R, 114G, and 114B. A first dichroic mirror 106 transmits the R light and reflects the G light and the B light received from the stacking lens 105. The R light having passed through the first dichroic mirror 106 is reflected by a reflection mirror 107, and converted into p-polarized light by the function of a ½ wavelength plate (not shown). An entrance side polarizer 113R transmits the p-polarized light. The liquid crystal display panel 114R converts the p-polarized light into s-polarized light according to an image signal. An exit side polarizer 115R transmits the s-polarized light received from the liquid crystal display panel 114R. The entrance side polarizer 113R, the liquid crystal display panel 114R, and the exit side polarizer 115R function as a spatial light modulation device which modulates the R light according to an image signal.

A second dichroic mirror 108 reflects the G light and transmits the B light received from the first dichroic mirror 106. The G light reflected by the second dichroic mirror 108 passes through an entrance side polarizer 113G which transmits s-polarized light, and enters the liquid crystal display panel 114G. The liquid crystal display panel 114G converts the s-polarized light into p-polarized light according to an image signal. An exit side polarizer 115G transmits the p-polarized light received from the liquid crystal display panel 114G. The entrance side polarizer 113G, the liquid crystal display panel 114G, and the exit side polarizer 115G function as a spatial light modulation device which modulates the G light according to an image signal.

The B light transmitted by the second dichroic mirror 108 passes through relay lenses 109 and 111, and reflection mirrors 110 and 112, and is converted into p-polarized light by the function of a ½ wavelength plate (not shown). An entrance side polarizer 113B transmits p-polarized light. The liquid crystal display panel 114B converts the p-polarized light into s-polarized light according to an image signal. An exit side polarizer 115B transmits the s-polarized light received from the liquid crystal display panel 114B. The entrance side polarizer 113B, the liquid crystal display panel 114B, and the exit side polarizer 115B function as a spatial light modulation device which modulates the B light according to an image signal. A cross dichroic prism 116 as a color combining system combines the respective color lights having passed through the exit side polarizer 115R, 115G, and 115B.

The second optical system 12 has a structure similar to that of the first optical system 11 except that the light traveling direction of the second optical system 12 is shifted from the light traveling direction of the first optical system by approximately 90 degrees. The first wavelength selective polarization converting element 13 is disposed between the cross dichroic prism 116 and the polarization prism 15 in the first optical system 11. The first wavelength selective polarization converting element 13 converts the polarization direction of the predetermined color light contained in the respective color lights received from the first optical system 11. In this embodiment, the first wavelength selective polarization converting element 13 converts the G light as the p-polarized light into s-polarized light. The respective color lights converted and equalized into s-polarized lights by the first wavelength selective polarization converting element 13 are converted into p-polarized lights by a ½ wavelength plate provided on the exit side of the first wavelength selective polarization converting element 13, and then enter the polarization prism 15.

The second wavelength selective polarization converting element 14 is disposed between the cross dichroic prism 116 and the polarization prism 15 in the second optical system 12. The second wavelength selective polarization converting element 14 converts the polarization direction of the predetermined color light contained in the respective color lights received from the second optical system 12. In this embodiment, the second wavelength selective polarization converting element 14 converts the G light as the p-polarized light into s-polarized light. The respective color lights converted and equalized into s-polarized light by the second wavelength selective polarization converting element 14 enter the polarization prism 15.

The polarization prim 15 is a combining system which combines the lights received from the first optical system 11 and the second optical system 12 and releases the combined light to a projection lens 2. The polarization prism 15 transmits the p-polarized light received from the first wavelength selective polarization converting element 13 and reflects the s-polarized light received from the second wavelength selective polarization converting element 14 to combine the lights from the first optical system 11 and the second optical system 12. Returning to FIG. 1, the projection lens 2 projects the light combined by the polarization prism 15 onto a screen (not shown) disposed outside the housing 3. The projector 1 can display a high resolution image by shifting optical images formed by the first optical system 11 and the second optical system 12 by half pixel in an oblique direction, for example. Alternatively, the projector 1 can display a high-luminance image by matching the pixels of the optical image produced by the first optical system 11 with the pixels of the optical image produced by the second optical system 12.

A first intake fan 21 and exhaust fans 22 are provided in the first area 5. The first intake fan 21 introduces air from the outside of the housing 3 into the first area 5 via a dustproof filter 20. The exhaust fans 22 are disposed in the vicinity of the light source 101 of the first optical system 11 and in the vicinity of the light source 101 of the second optical system 12. The exhaust fans 22 discharge air from the first area 5 to the outside of the housing 3. The first intake fan 21 and the exhaust fans 22 function as a first air supply unit for introducing cooling air from the outside of the housing 3 via the dustproof filter 20. The first area 5 is a dustproof area into which cooling air can be introduced from the outside of the housing 3 via the dustproof filter 20.

A second intake fan 24 and an exhaust fan 25 are provided in the second area 6. The second intake fan 24 introduces air from the outside of the housing 3 into the second area 6 via a dustproof filter 23. The dust filter 20 provided for the first intake fan 21 of the first area 5 has higher dustproof capability than that of the dustproof filter 23 provided for the second intake fan 24 of the second area 6 so as to maintain higher cleanliness in the first area 5 than in the second area 6. Thus, adhesion of dust or the like to the optical elements contained in the first area 5 can be prevented.

Figure 3:
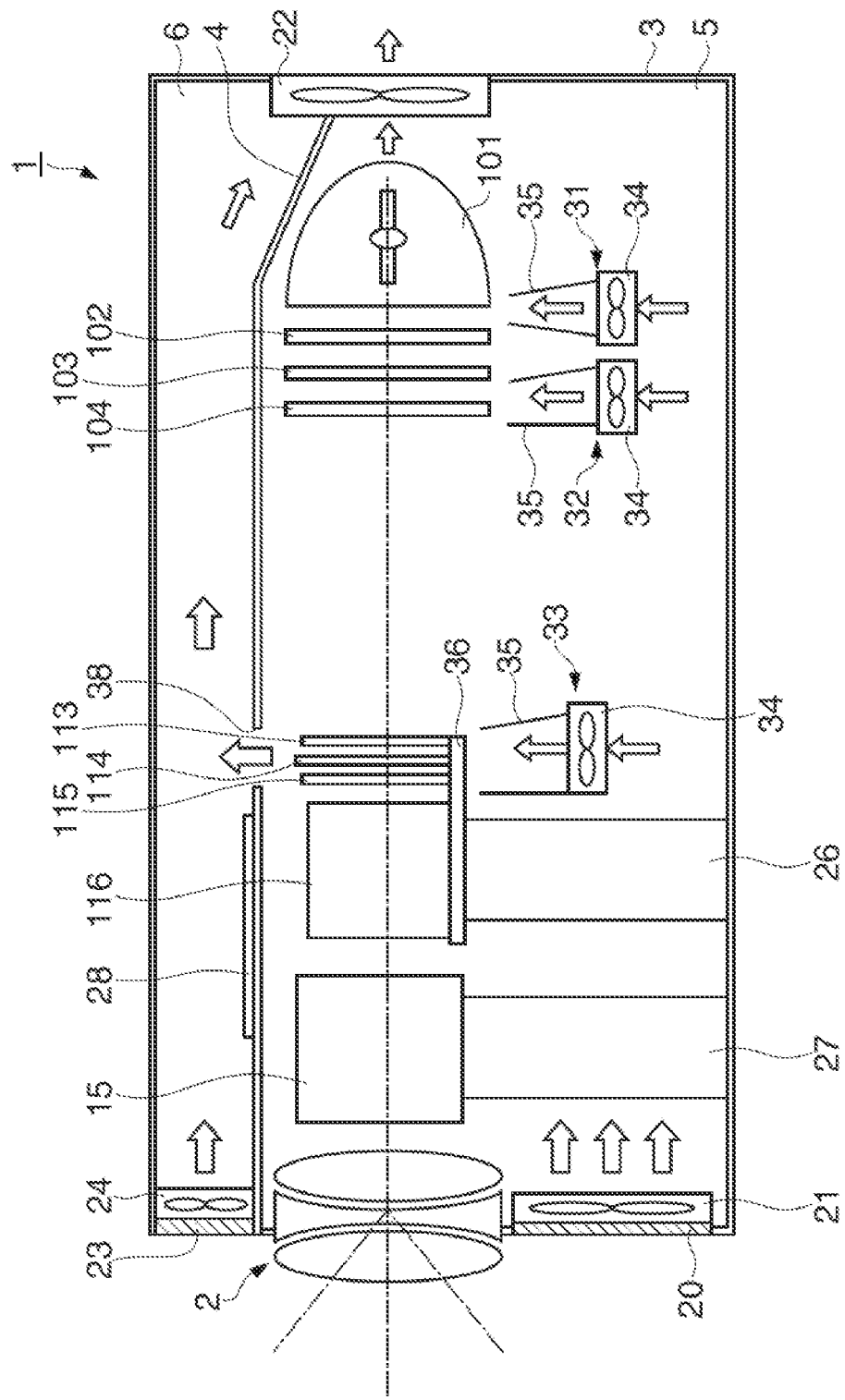
FIG. 3 is a cross-sectional view schematically illustrating a structure example of the projector.

FIG. 3 is a cross-sectional view schematically illustrating an example of the structure of the projector 1. FIG. 3 shows only a part of the components of the projector 1 shown in FIG. 1 as the part to be described, and eliminates other elements not specifically explained herein. White arrows in the figure indicate the chief direction of the flow of the cooling air. The entrance side polarizer 113 (113R, 113G, and 113B), the liquid crystal display panels 114 (114R, 114G, and 114B), the exit side polarizer 115 (115R, 115G, and 115B), and the cross dichroic prism 116 are positioned relative to each other and combined into one body by a supporting member 36. The supporting member 36 is mounted on a first control mechanism 26. The first control mechanism 26 collectively controls the positions and rotations (inclinations) of the entrance side polarizer 113, the liquid crystal display panels 114, the exit side polarizer 115, and the cross dichroic prism 116 attached to the supporting member 36.

The polarization prism 15 is mounted on a second control mechanism 27. The second control mechanism 27 controls the position and rotation (inclination) of the polarization prism 15. The projector 1 aligns the pixels of the optical image produced by the first optical system 11 with the pixels of the optical image produced by the second optical system 12 by controlling the positions of the liquid crystal display panels 114 and the like using the first control mechanism 26 and the position of the polarization prism 15 using the second control mechanism 27. The projector 1 may include an additional control mechanism for controlling positions of other optical elements as well as the first control mechanism 26 and the second control mechanism 27.

Cooling mechanisms 31, 32, and 33 are provided for the light source 101, the polarization converting element 104, and the components of the entrance side polarizer 113, the liquid crystal display panels 114, and the exit side polarizer 115 on the supporting member 33 included in the optical elements in the first area 5 as the chief cooling target elements, respectively. The cooling mechanisms 31, 32, and 33 are all contained in the first area 5. Each of the cooling mechanisms 31, 32, and 33 has a fan 34 and a duct 35. The fan 34 included in each of the cooling mechanisms 31, 32, and 33 functions as a second air supply unit for supplying the cooling air introduced to the first area 5 by the first air supply unit toward the respective optical elements.

The cooling mechanism 31 is provided in the vicinity of the light source 101 to supply cooling air to the light source 101. The duct 35 of the cooling mechanism 31 is directed toward an opening of a reflector of the light source 101, for example. The cooling mechanism 32 is provided in the vicinity of the polarization converting element 104. The cooling mechanism 32 supplies cooling air to the polarization converting element 104 through the duct 35. The cooling mechanism 33 is provided in the vicinity of the supporting member 36. The cooling mechanism 33 supplies cooling air to the entrance side polarizer 113, the liquid crystal display panels 114, and the exit side polarizer 115 through the duct 35. Each of the cooling mechanisms 31, 32, and 33 is provided close to the corresponding cooling target element such that the size of the duct 35 can be reduced.

While FIG. 3 shows only the cooling mechanism 33 as the cooling mechanism for supplying cooling air to the entrance side polarizer 113, the liquid crystal display panels 114, and the exit side polarizer 115, the cooling mechanism 33 may be constituted by a plurality of cooling mechanisms. For example, the cooling mechanism 33 may have a cooling mechanism 33R for supplying cooling air to the entrance side polarizer 113R, the liquid crystal display panel 114R, and the exit side polarizer 115R for the R light, a cooling mechanism 33G for supplying cooling air to the entrance side polarizer 113G, the liquid crystal display panel 114G, and the exit side polarizer 115G for the G light, and a cooling mechanism 33B for supplying cooling air to the entrance side polarizer 113B, the liquid crystal display panel 114B, and the exit side polarizer 115B for the B light.

The cooling air enters the first area 5 from the first intake fan 21 via the dustproof filter 20. The cooling air having entered the first area 5 is supplied to the optical elements as the cooling target elements by the function of the cooling mechanisms 31, 32, and 33. The cooling air having received heat from the optical elements as the cooling target elements is discharged to the outside of the housing 3 by the function of the exhaust fan 22. The cooling mechanisms 31, 32, and 33 can be positioned with a high degree of freedom within the first area 5.

For example, the direction of the entire mechanism or the duct 35 of the cooling mechanism 33 for supplying cooling air to the liquid crystal display panels 114 and the like can be adjusted according to the position control of the liquid crystal display panels 114 and the like performed by the first control mechanism 26. According to the structure in this embodiment, the positions of the cooling mechanisms 31, 32, and 33 can be appropriately controlled in accordance with the positions of the optical elements as the cooling target elements, which increases the efficiency of cooling for the optical elements. A control mechanism for position control may be equipped at least for one of the cooling mechanisms 31, 32, and 33 as the second air supply units.

The light source, the ballast, the circuit, and the controller contained in the second area 6 correspond to cooling target elements other than the optical elements. For example, a circuit board 28 for driving the liquid crystal display panels 114 is accommodated in the second area 6. In this embodiment, the circuit board 28 is explained as a typical example of the cooling target elements contained in the second area 6, and other cooling target elements included in the second area 6 but not shown in the figure are not specifically explained herein.

The cooling air enters the second area 6 from the second intake fan 24 via the dustproof filter 23. The cooling air having entered the second area 6 and received heat from the circuit board 28 and others is discharged to the outside of the housing 3 by the function of the exhaust fan 22. As illustrated in FIG. 3, the exhaust fan 22 may be a common component for the first area 5 and the second area 6. Alternatively, as illustrated in FIG. 1, the exhaust fans 22 and 25 may be provided for the first area 5 and the second area 6, respectively.

A clearance 38 is formed on the partitioning wall 4 which separates the first area 5 from the second area 6. The clearance 38 is an opening through which a flexible substrate (not shown) connecting the liquid crystal display panels 114 and the circuit board 28 penetrates, for example. The clearance 38 also functions as a hole through which the cooling air passes from the first area 5 toward the second area 6.

The operations of the first intake fan 21 and the exhaust fan 22 are controlled such that the amount of the cooling air introduced into the first area 5 by the first intake fan 21 becomes larger than the amount of the cooling air exhausted from the first area 5 by the exhaust fan 22. Moreover, the operations of the first intake fan 21 and the second intake fan 24 are controlled such that the amount of the cooling air introduced into the first area 5 by the first intake fan 21 becomes larger than the amount of the cooling air introduced into the second area 6 by the second intake fan 24. By this method, the first intake fan 21 and the exhaust fans 22 generates a flow of cooling air such that the internal pressure of the first area 5 becomes higher than the internal pressure of the second area 6.

Under the condition that the internal pressure of the first area 5 is higher than that of the second area 6, a flow of cooling air from the first area 5 to the second area 6 is produced at the clearance 38. Thus, entrance of dust or the like into the first area 5 from the second area 6 via the clearance 38 can be prevented. It is preferable that the internal pressure of the first area 5 is higher than the external pressure outside the housing 3. In this case, entrance of outside air from anywhere other than the first intake fan 21 into the first area 5 is prevented, which maintains sufficient cleanliness of the first area 5.

The relationship between the positions and volumes of the first area 5 and the second area 6 in the housing 3 can be arbitrarily determined according to the structure of the projector 1. For example, the first area 5 and the second area 6 may be disposed in parallel with each other in the horizontal direction so as to reduce drops of dust and the like through the clearance 38 during stop of operation of the air supply units.

In case of a structure which includes a number of elements such as a controlling mechanism for optical elements, a power source, and a circuit as well as dual optical systems as in this embodiment, it is extremely difficult to provide cooling ducts capable of sequentially supplying cooling air to respective cooling target elements. However, according to this embodiment in which the first air supply unit for introducing air to the first area 5 and the second air supply unit for supplying cooling air to the respective optical elements within the first area 5 are employed in place of the cooling ducts, the second air supply unit can be positioned with a high degree of freedom for the respective optical elements. Thus, prevention of adhesion of dust and the like to the optical elements and reduction of limitation to disposition of the cooling mechanisms for the cooling target elements are both achieved, which increases the efficiency of cooling for the cooling targets. Particularly in case of the projector 1 of high-accuracy type or high-luminance type, efficient cooling can be provided even when the number of components is large or when position control of the optical elements is required.

The clearance 38 is not limited to a hole through which the flexible substrate connecting the liquid crystal display panels 114 and the circuit board 28 penetrates but may be a clearance provided at other positions as long as the internal pressure of the first area 5 becomes higher than the internal pressure of the second area 6. For example, the clearance 38 may be disposed in such a position as to allow cooling air to be supplied in a desirable direction within the first area 5 and the second area 6 as well as the position through which the flexible substrate penetrates.

The projector 1 is only required to reduce the flow of the cooling air from the second area 6 to the first area 5 during actuation of the air supply units. Thus, the air supply units may be modified in an appropriate manner. For example, the exhaust fan 22 provided in the first area 5 may be eliminated, and the entire air introduced by the first intake fan 21 may be discharged by the exhaust fan 25 equipped in the second area 6.

Figure 4:
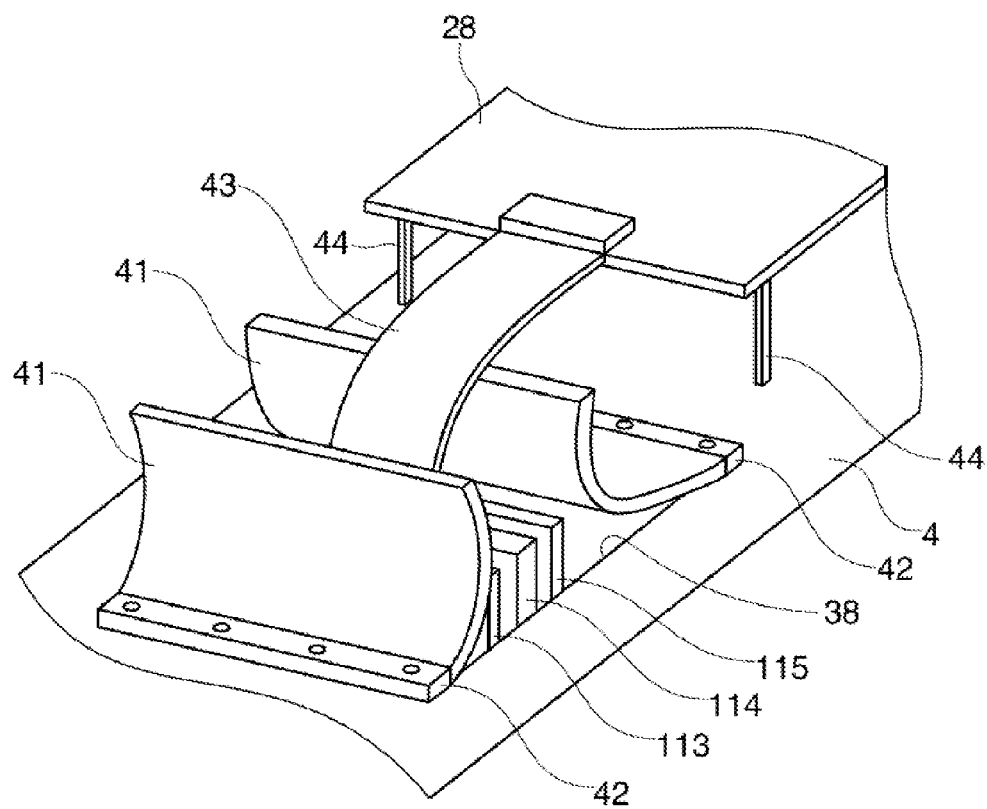
FIG. 4 is a perspective view illustrating a structure of a characteristic part according to a modified example.

FIG. 4 is a perspective view illustrating the structure of a characteristic part in a modified example of this embodiment. This modified example includes an open/close unit 41 provided for opening and closing the clearance 38. The open/close unit 41 has two plate components, for example. The plate components are made of material having flexibility such as soft resin materials including polyimide and film materials.

The open/close unit 41 is disposed on the second area 6 side with respect to the partitioning wall 4 and formed in such a manner as to open and close the clearance 38. The respective plate components constituting the open/close unit 41 are fixed to positions on the partitioning wall 4 close to the clearance 38 by using fixing units 42. In this case, the respective ends of the plate components are fixed to opposed positions of the clearance 38 by the fixing units 42. The respective ends of the plate components on the side opposite to the side fixed by the fixing units 42 are opposed to each other with a flexible substrate 43 interposed between the opposed ends. FIG. 4 illustrates the open/close unit 41 in the opened condition. The circuit board 28 is disposed on the partitioning wall 4 via supporting portions 44. By providing the supporting portions 44 between the partitioning wall 4 and the circuit board 28, a space for allowing opening and closing of the open/close unit 41 is produced between the partitioning wall 4 and the flexible substrate 43.

Figure 5:
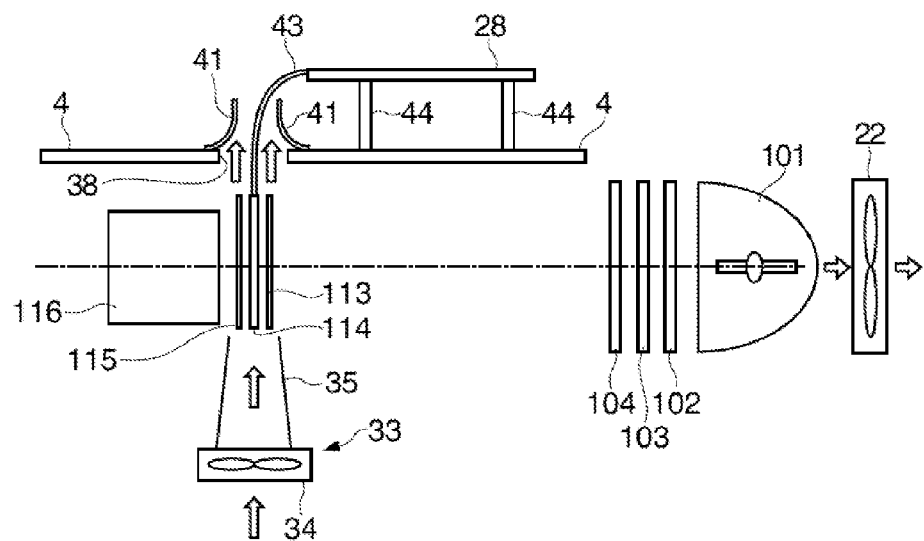
FIG. 5 schematically illustrates a condition of an open/close unit during operation of an air supply unit.
Figure 6:
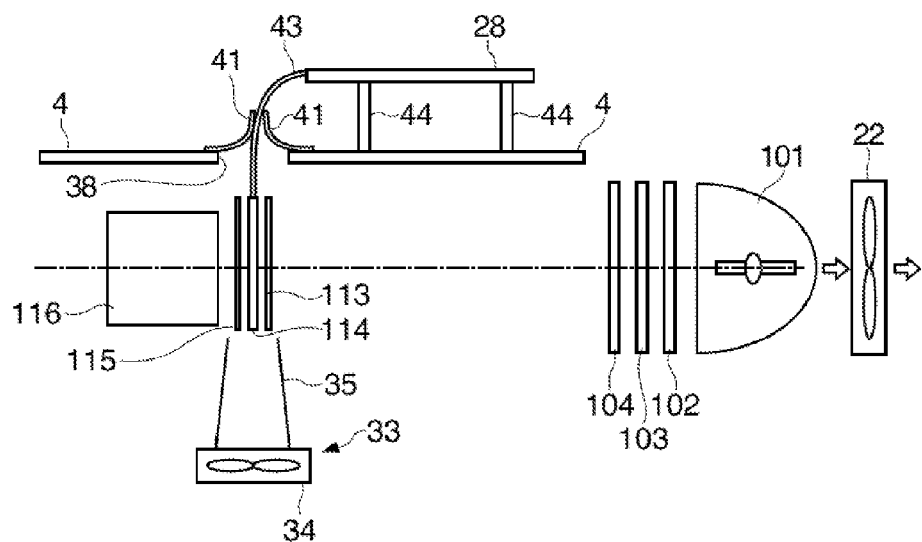
FIG. 6 schematically illustrates a condition of the open/close unit during stop of operation of the air supply unit.

FIG. 5 schematically illustrates the condition of the open/close unit 41 during operation of the air supply unit. FIG. 6 schematically illustrates the condition of the open/close unit 41 during stop of operation of the air supply unit. In this example, only a part of the components of the projector 1 shown in FIG. 1 are described and depicted, and other elements not specifically explained herein are not shown in the figure. White arrows in the figure indicate the chief flow direction of the cooling air.

Figure 7:
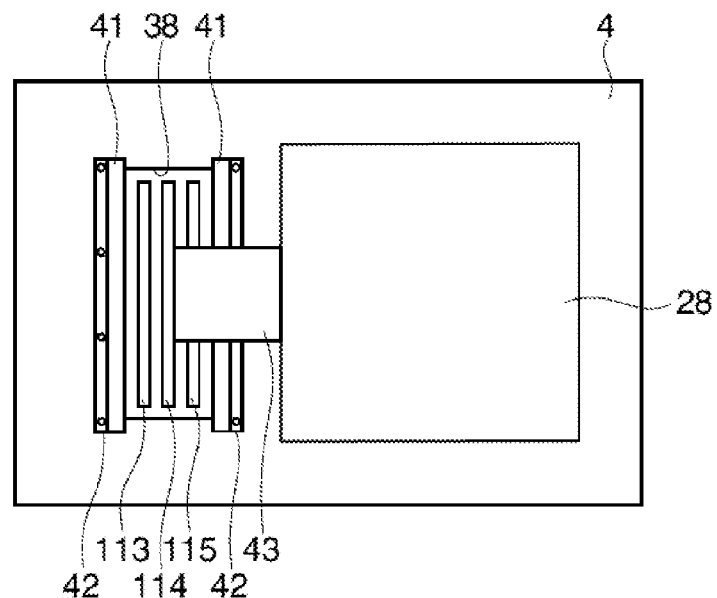
FIG. 7 schematically illustrates the upper surface of the open/close unit and others shown in FIG. 5 as viewed from a second area.

FIG. 7 schematically illustrates the upper surface structure of the open/close unit 41 and the surroundings of the open/close unit 41 shown in FIG. 5 as viewed from the second area 6 side. While the air supply unit is actuating, the open/close unit 41 opens by the air pressure of the cooling air flowing from the first area 5 to the second area 6. Thus, while the air supply unit is operating, the open/close unit 41 opens to supply the cooling air from the first area 5 to the second area 6 through the clearance 38.

Figure 8:
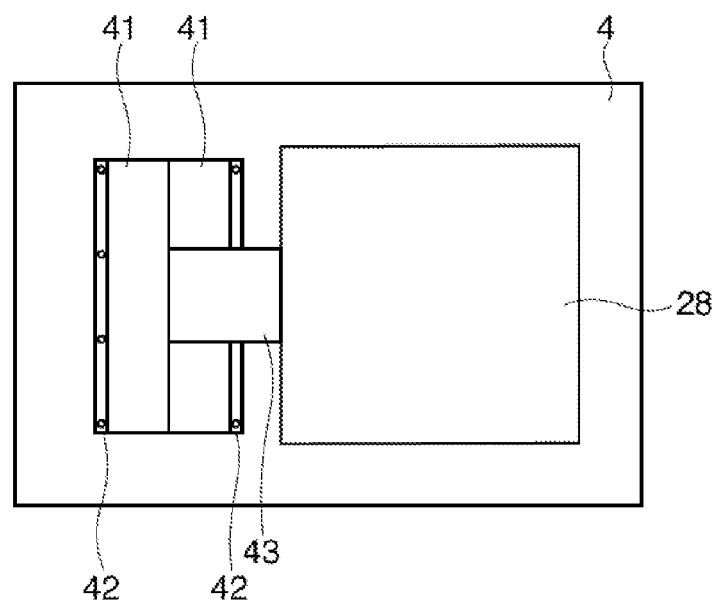
FIG. 8 schematically illustrates the upper surface of the open/close unit and others shown in FIG. 6 as viewed from the second area.

FIG. 8 schematically illustrates the upper surface structure of the open/close unit 41 and the surroundings of the open/close unit 41 shown in FIG. 6 as viewed from the second area 6 side. While the cooling air is not flowing from the first area 5 to the second area 6 by stop of the operation of the air supply unit, the open/close unit 41 closes with the flexible substrate 43 interposed between the components of the open/close unit 41. Under the closed condition of the open/close unit 41 during stop of the air supply unit, the first area 5 is sealed so as to maintain a clean condition therein. Accordingly, the open/close unit 41 functions as an open/close valve which opens during operation of the air supply unit and closes during stop of the air supply unit. When the open/close unit 41 is made of flexible material, the flexible substrate 43 is not damaged by the opening and closing of the open/close unit 41.

The projector 1 provided with the open/close unit 41 can maintain high dustproof capability for the first area 5 during stop of operation of the air supply unit, and also can discharge cooling air having passed through the first area 5 and then the second area 6 during operation of the air supply unit. The open/close unit 41 is not limited to a unit which opens and closes in accordance with the air pressure of the cooling air but may be a mechanism or the like which can mechanically perform opening and closing operation in accordance with the actuation of the air supply unit, for example.

The spatial light modulation device of the projector 1 is not limited to a structure which includes a transmission type liquid crystal display panel. The spatial light modulation device may be a type which includes a reflection type liquid crystal display device (liquid crystal on silicon: LCOS), a DMD (digital micromirror device), a GLV (grating light valve) or the like. The number of the optical systems included in the projector 1 for producing optical images is not limited to two but may be one or three or more. According to the projector 1 in this embodiment, the three cooling mechanisms 31, 32, and 33 are provided as cooling mechanisms each of which has the fan 34 as the second air supply unit. However, the number of the cooling mechanisms is not limited to three but may be one or a plural number.

What is claimed is:

1. A projector comprising:
a housing;
a spatial light modulation device modulating a projected light according to an image signal;
a dustproof filter capturing dust;
a partitioning wall separating inside of the housing into a first area and a second area, the partitioning wall completely partitioning the second area from the first area and having a clearance through which the cooling air flows;
a first intake fan introducing cooling air from outside of the housing via the dustproof filter into the first area; and
an exhaust fan which discharges cooling air to outside the housing,
wherein,
the first area accommodates a first cooling target including the spatial light modulation device,
the second area accommodates a second cooling target including a circuit board, and
the cooling air introduced into the first area via the dustproof filter and cools the first cooling target, and a portion of the cooling air flows through the clearance and cools the second cooling target in the second area, while another portion of the cooling air is discharged from the first area to the outside of the housing by the exhaust fan.

2. The projector according to claim 1, further comprising:
an open/close unit configured to open and close the clearance.

3. The projector according to claim 1, wherein
the first intake fan generates a flow of the cooling air such that the internal pressure of the first area becomes higher than the internal pressure of the second area.

4. The projector according to claim 1, further comprising:
an exhaust fan discharging the cooling air from the first area to the outside of the housing; wherein
the intake fan and the exhaust fan operate such that the amount of the cooling air introduced to the first area by the intake fan becomes larger than the amount of the cooling air discharged from the first area by the exhaust fan.

5. The projector according to claim 1, further comprising:
a second intake fan introducing the cooling air from the outside of the housing to the second area, wherein
the first intake fan and the second intake fan operate such that the amount of the cooling air introduced to the first area by the first intake fan becomes larger than the amount of the cooling air introduced to the second area by the second intake fan.

6. The projector according to claim 1, further comprising:
a fan supplying the cooling air introduced to the first area by the first intake fan toward the spatial light modulation device.

* * * * *